UNITED STATES PATENT OFFICE.

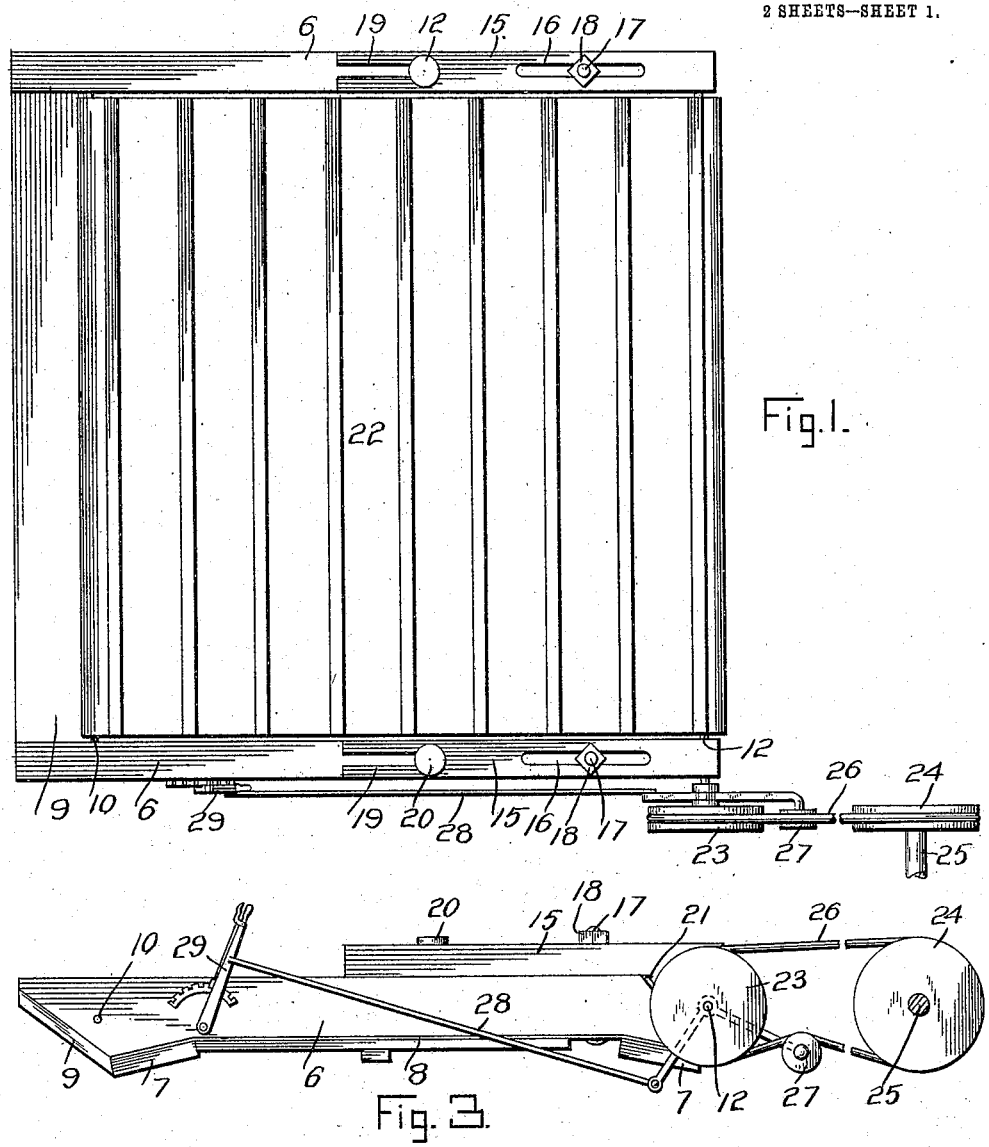

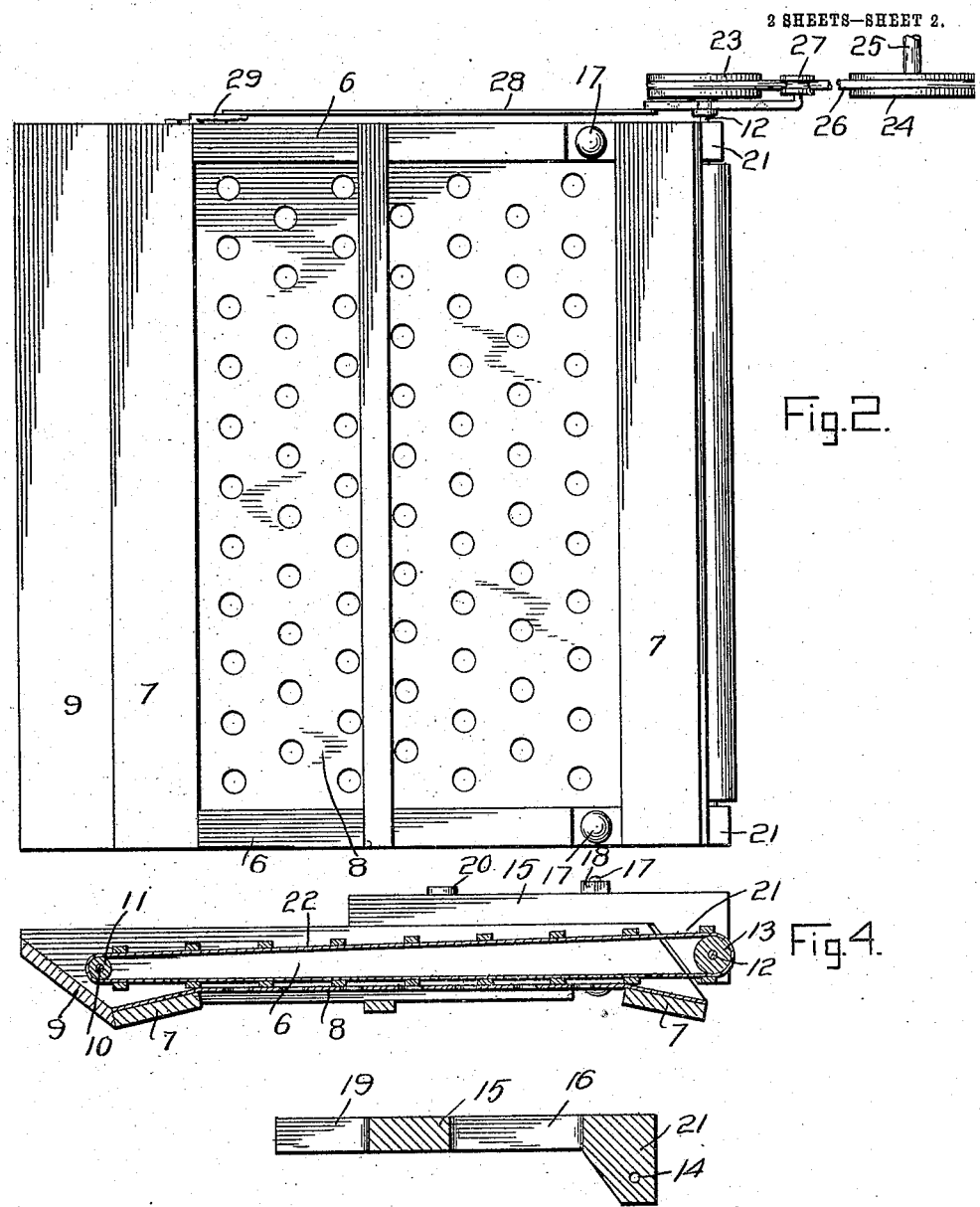

ABRAM J. KOISTINEN, OF BRYANT, SOUTH DAKOTA.

SEPARATOR.

No. 908,012.　　　　　Specification of Letters Patent.　　　　Patented Dec. 29, 1908.

Application filed May 13, 1907. Serial No. 373,431.

*To all whom it may concern:*

Be it known that I, ABRAM J. KOISTINEN, a citizen of the United States, residing at Bryant, in the county of Hamlin, State of South Dakota, have invented certain new and useful Improvements in Separators; and I do hereby declare the following to be a full, clear, and exact description of the invention, such as will enable others skilled in the art to which it appertains to make and use the same.

This invention relates to grain separators and has for its object to provide a simple but very efficient mechanism of the class stated.

One of the novel features of the invention resides in the provision of a sieve which is arranged in a frame, and an apron or conveyer which is arranged for travel above the sieve and serves to force grain of a certain size through the openings in the sieve, the grain being delivered to mechanism at one end of the sieve upon a board which is adapted to direct it between the sieve and the conveyer after which it is drawn over the sieve toward the opposite end thereof.

A further novel feature of the invention lies in the form of driving means employed for the conveyer, there being means for adjusting the tension of the drive belt and the conveyer belt so that the work performed by the mechanism under different conditions will be uniformly satisfactory.

In the accompanying drawings, Figure 1 is a top plan view of the separator, Fig. 2 is a bottom plan view thereof, Fig. 3 is a side elevation, Fig. 4 is a vertical longitudinal sectional view taken centrally thereof, and, Fig. 5 is a similar view taken through one of the devices for adjusting the tension of the conveyer belt.

As shown in the drawings, the separator comprises a frame including side sills 6 and connecting sills 7, which are secured at their ends to the undersides of the side sills adjacent their ends. Arranged in the frame thus formed and in a plane with the under sides of the side sills is a sieve or screen 8 which is in the form of a foraminous plate, it being understood of course that the said sieve extends from one to the other of the side sills and likewise from one to the other of the connecting sills. A grain board 9 is arranged in inclined position at the forward end of the frame and extends from one to the other of the said side sills and is so positioned that grain deposited thereon will be directed, by reason of the inclination of the board, onto the sieve.

A shaft 10 carrying a roller 11 is journaled in the side sills of the frame directly above the lower edge of the grain board and a shaft 12, carrying a roller 13, is journaled in suitable bearings 14 upon the rear ends of blocks 15 at the rear end of the frame. These blocks are provided with slots 16 through which are engaged bolts 17 having engaged thereon nuts 18, these bolts serving as a means whereby the blocks may be held at various adjustments. In order to prevent lateral movement of the blocks, they are bifurcated at their forward ends as at 19 for the reception of headed studs 20 upon the upper edges of the side sills of the frame. At their rear ends, the blocks are provided with depending portions 21 which, when the blocks are at the limit of their forward adjustment, abut the rear ends of the corresponding side sills.

An endless conveyer belt 22 is engaged over the rollers upon the two shafts above described, and the under stretch of this belt is designed to travel over the upper face of the sieve in contact therewith so as to drag the grain deposited upon the sieve, from the front end thereof to the rear end.

A grooved pulley 23 is fixed upon the shaft 12 and over this pulley and a similar pulley 24 carried by a drive shaft 25 is engaged a drive belt 26.

Loosely mounted for rocking movement upon the shaft 12 is an angle lever at the end of one arm of which is journaled a roller 27 over which the drive belt also passes and to the other arm of this lever is pivotally connected one end of a connecting rod 28 which leads from a lever 29 pivotally mounted upon one of the side sills of the frame, it being understood that this lever may be rocked to cause the roller to bear more or less firmly against the drive belt to adjust the tension of the same.

What is claimed is:

In a separator, a supporting frame consisting of side sills, a roller journaled therebetween adjacent to one end thereof; blocks slidably mounted on the sills at the other end, said blocks having at one end a vertical slot, at the other end an arm downwardly projecting and provided with a horizontal bearing, and a second slot intermediate said ends; bolts passing through said slots into the sills; a roller journaled in said bearings; a conveyer belt traveling over the rollers; a screen beneath the conveyer; a belt pulley fixed upon said rollers; and a belt tightener supported on said roller and said side sills.

In testimony whereof, I affix my signature, in presence of two witnesses.

ABRAM J. KOISTINEN.

Witnesses:
G. A. S. ARERSON,
W. G. AYRESON.